Figure 1:
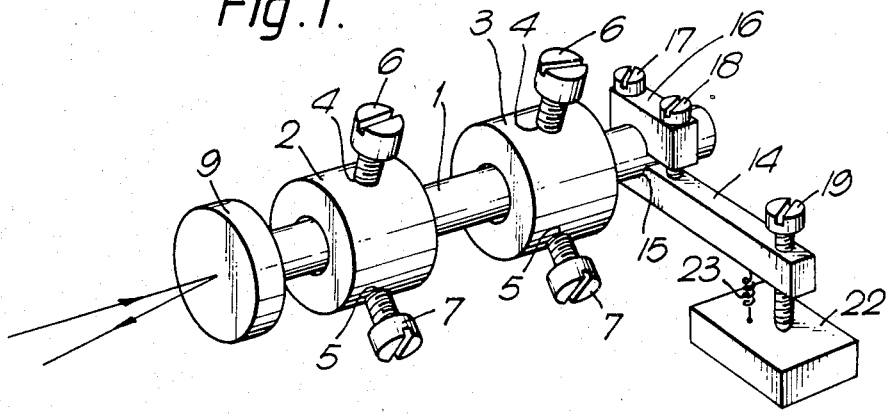

United States Patent [19]

Perkins

[11] Patent Number: 4,637,695
[45] Date of Patent: Jan. 20, 1987

[54] ADJUSTING THE DIRECTION OF A BEAM OF RADIATION

[75] Inventor: Charles V. Perkins, Cambridge, England

[73] Assignee: U.S. Philips Corporation, New York, N.Y.

[21] Appl. No.: 748,524

[22] Filed: Jun. 25, 1985

[30] Foreign Application Priority Data

Jun. 26, 1984 [GB] United Kingdom ............... 8416263

[51] Int. Cl.[4] .......................... A47F 7/14; G02B 26/08
[52] U.S. Cl. .................................. 350/631; 248/467; 350/486
[58] Field of Search .................... 248/205.3, 467; 356/138, 153, 154; 350/320, 631, 632, 486; 29/700, DIG. 1

[56] References Cited

U.S. PATENT DOCUMENTS 4,061,415 12/1977 Taenzer ............................... 350/320

OTHER PUBLICATIONS

IBM Technical Disclosure Bulletin, vol. 24, No. 1A, Jun. 1981, pp. 417–419.

Primary Examiner—John K. Corbin
Assistant Examiner—Vincent J. Lemmo
Attorney, Agent, or Firm—Paul R. Miller

[57] ABSTRACT

A method and apparatus is provided for adjusting the direction of a beam of radiation by a mirror mounted on a shaft so that the normal to the mirror is inclined relative to the longitudinal axis of the shaft. The shaft is mounted in a bearing for rotational adjustment relative to a supporting structure. This technique and structure may be applied to monochromators or interferometers in which radiation beams must be adjusted in direction to very close tolerances, such as seconds of arc, and maintained in direction with a corresponding stability. The shaft is rigidly secured in the bearing after adjustment by an adhesive so that a stress-free structure is realized in which hysteresis effects due to temperature cycling are minimized.

11 Claims, 3 Drawing Figures $\delta = 2\theta\phi$

ADJUSTING THE DIRECTION OF A BEAM OF RADIATION

This invention relates to apparatus for adjusting the direction of a beam of radiation comprising a mirror mounted on a shaft so that the normal to the mirror is inclined relative to the longitudinal axis of the shaft, the shaft being mounted in a bearing for rotational adjustment relative to a supporting structure.

The invention also relates to a method of adjusting the direction of a beam of radiation reflected from a mirror comprising the steps of mounting the mirror on a shaft with a mirror normal inclined to the longitudinal axis of the shaft placing the shaft as a loose fit in a bearing, rotating the shaft in the bearing to adjust the direction of the reflected beam and, when the adjustment has been made, rigidly securing the shaft in the bearing.

Examples of optical apparatus to which the invention is applicable are monochromators or interferometers which latter may, for example, be used in Fourier transform spectrometers. In such instruments radiation beams must be adjusted in direction to very close tolerances, typically seconds of arc, and maintained in direction with a corresponding stability. Typically, a beam may be reflected off a beam reversing or deflecting mirror and this mirror may conveniently be used to make the directional adjustment.

Methods of making small angular adjustments to reversing mirrors are described in Chapter 11.7 of the textbook "The Design of Optical Spectrometers" by J. F. James and R. S. Sternberg, Chapman and Hall 1969. The adjustment methods described therein involve adjustable screws working against springs under stress. Thus the adjustment apparatus is in a state of stress during use of the instrument and not merely during adjustment. Inevitably stress relief will take place assisted by fluctuations in temperature which will produce stress cycling with hysteresis effects. Such stressed structures are therefore inherently unstable and it is an object of the invention to provide an adjustment apparatus which is free from stress, at least during instrument use and preferably also during adjustment.

The invention provides an arrangement for adjusting the direction of a beam of radiation comprising a mirror mounted on a shaft so that the normal to the mirror is inclined relative to the longitudinal axis of the shaft, the shaft being mounted in a bearing for rotational adjustment relative to a supporting structure characterised in that the shaft is rigidly secured in the bearing after adjustment by means of an adhesive. Arrangements in accordance with the invention are suitable for making small directional adjustments and may be characterised in that the mirror normal is inclined at such an angle to the longitudinal axis that the sine of the angle is substantially equal to the angle expressed in radians.

The directional stability of the longitudinal axis of the shaft may be improved in an arrangement in accordance with the invention which is characterised in that the bearing comprises two plain bearings axially separated along said shaft.

The mirror may be curved to provide focusing action in the instrument. In this case the mirror normal concerned is that at the mirror surface at its intersection with the longitudinal axis. Also, the shaft may be moved longitudinally in the bearing to provide a focussing adjustment. A simple arrangement in accordance with the invention may be characterised in that the mirror is a plane mirror.

The invention also provides a method of adjusting the direction of a beam of radiation reflected from a mirror comprising the steps of mounting the mirror on a shaft with a mirror normal inclined to the longitudinal axis of the shaft, placing the shaft as a loose fit in a bearing, rotating the shaft in the bearing to adjust the direction of the reflected beam, and, when the adjustment has been made, rigidly securing the shaft in the bearing, characterised in that the step of rigidly securing the shaft comprises the steps of applying an adhesive between the shaft and the bearing and causing the adhesive to set.

A method in accordance with the invention may be characterised by the steps of lightly loading the shaft against the bearing before adjustment and removing the loading after the adhesive has set. This will reduce undesired movement of the shaft during adjustment due to the loose fit of the shaft in the bearing.

A method in accordance with the invention may be characterised by the step of loading the shaft against the bearing kinematically. In such kinematic loading the position and direction of the longitudinal axis is uniquely defined relative to the bearing and its supporting structure by the minimum number of geometrical constraints. Further, the method may be characterised by the step of loading the shaft kinematically by means of adjustable screws set in the bearing at an angle to one another between 45° and 135° around the bearing, the screws being adjusted to produce light contact between the inner ends of the screws and the shaft and between the shaft and the bearing surface, and the step of removing the screws after the adhesive has set. Stress remaining in the shaft and bearing is thereby minimised.

A method in accordance with the invention may be characterised by the bearing comprising two plain bearings axially separated along said shaft. The directional stability of the longitudinal axis of the shaft may be improved thereby.

A method in accordance with the invention may be characterised by the step of attaching to the shaft means for rotating the shaft for making the adjustment and the step of removing said means after the adhesive has set. Again, stress remaining in the shaft and bearing is thereby minimised.

In an optical instrument embodying the invention it may be desired to make very small adjustments in the direction of a radiation beam reflected by the plane mirror when the instrument is assembled during manufacture. It is a feature of an arrangement or method in accordance with the invention that very small angular adjustments in beam direction can be made with relatively large angular movements of the shaft. If the small angle between the mirror normal and the shaft rotation axis is $\theta$ radians and if the shaft is rotated through a small angle $\phi$ radians, then a beam reflected by the mirror is deflected through an angle $\delta$ radians given by:

$$\delta = 2\theta\phi$$

Thus $\delta$ is a small fraction, $2\theta$, of the shaft rotation $\phi$.

Figure 2:
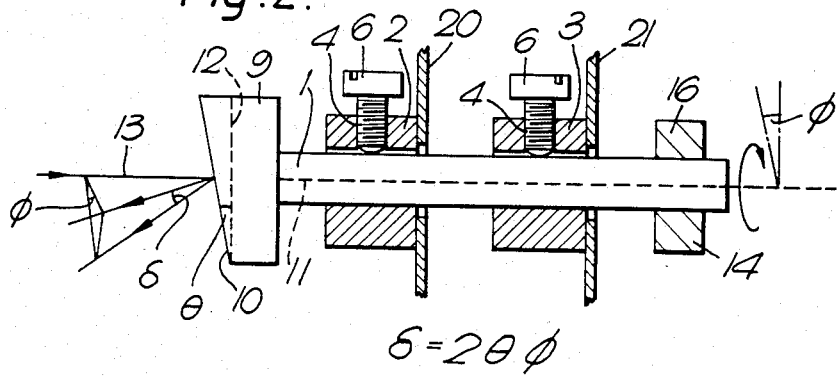
Figure 3:
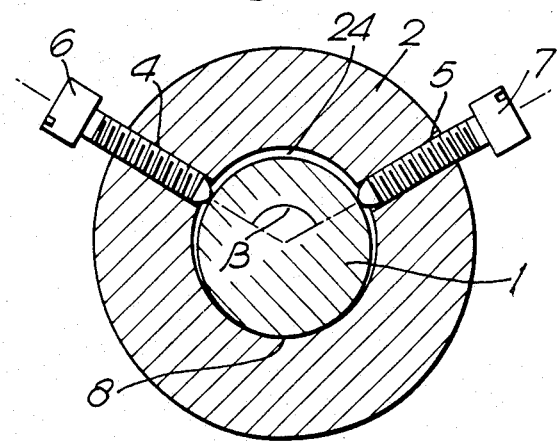

An embodiment of the invention will now be described, by way of example, with reference to the accompanying drawing in which:

FIG. 1 shows a general perspective view of an arrangement for adjusting the direction of a beam of radiation, FIG. 2 shows a section by a plane in the shaft axis of the arrangement of FIG. 1, and FIG. 3 shows a section by a plane normal to the shaft axis through one of the bearings of FIGS. 1 or 2.

Referring to FIG. 1 a plain cylindrical shaft 1 is shown as a loose fit in two plain bearings 2 and 3. A structure supporting the two bearings is not shown for ease of illustration, but is shown in part section at 20 and 21 in FIG. 2. Each bearing has two tapped radial holes 4 and 5 carrying radially adjustable screws 6 and 7 respectively. FIG. 3 shows a section through one of the bearings by a plane normal to the shaft axis. The screws 6 and 7 are advanced into the tapped holes so that each contacts the shaft and the shaft contacts the bearing at 8. With the angle $\beta$ between the radial directions lying between 45 degrees and 135° a stable, three point, kinematic bearing is provided for the shaft, locating its axis at a point in a plane through the bearing. The second bearing 3, axially separated from bearing 2 similarly provides a second location point in a second plane separated from the first and hence defines the position of the shaft completely relative to the structure. It should be noted that screws 6 and 7 are advanced only so far as to ensure light contact at the three points and are not tightened, thereby avoiding built-in stress, ensuring kinematic shaft location, but leaving the shaft free to make rotational movement for adjustment purposes only.

Other types of kinematic bearing may be used, for example a Vee edge, the shaft resting against the two sides of the Vee under gravity. The FIG. 3 bearing has the advantage that a narrow gap is provided almost all round the shaft into which a liquid adhesive will run under capillary action. The location of the shaft will therefore be solid once the adhesive has set, the screws 6 and 7 then being removed.

Referring to FIGS. 1 and 2 a glass substrate 9 is mounted on the end of shaft 1. Surface 10 is a front metallised mirror and is set at a small angle $\theta$ to a plane 12 normal to the shaft rotation axis 11. Hence a normal to the mirror 10 is at the angle $\theta$ to axis 11. If the shaft 1 were rotated through a complete turn, the normal to mirror 10 would describe a conical surface of semivertical angle $\theta$. The planes 10 and 12 if produced, would intersect in a line normal to axis 11 and, as drawn in FIG. 2 with angle $\theta$ shown, normal to the plane of the drawing. A small rotation $\phi$ of shaft 1 from the position shown in FIG. 2 will deflect the normal up out of the plane of the paper in a deflection plane parallel to the line of intersection of planes 10 and 12, the deflection plane being a small sector of the conical surface described by the normal. Thus a ray 13 parallel to axis 11 incident on surface 10 is deflected up out of the plane of the paper. Allowing for the law of reflection of light at a plane mirror, if $\theta$ is a small angle in the sense that $\sin\theta$ is substantially equal to $\theta$ expressed in radians and if the shaft is rotated through a small angle $\phi$, the reflected ray will be deflected by an angle $\delta$ given by:

$$\delta = 2\theta\phi$$

For example if $\theta = 1°$, i.e. 0.0174 radians, then $$\delta = 0.0348\phi \text{ or } \phi/28.7.$$

The beam angular deflection is thus a small fraction, 1/28.7, of the shaft rotation $\phi$. The effect is provided of a gear reduction in rotation angle in which the gear ratio can be selected by the choice of $\theta$.

In FIG. 2 the incident ray 13 is at an angle $\theta$ to the mirror normal. In an optical instrument in which the mirror is a beam reversing mirror, the ray would be incident normally on the mirror in the middle of the adjustment range. Then, shaft rotation would deflect the ray above or below the plane of the paper. In a Michelson interferometer, for example, having two such reversing mirror adjusters, one for each subbeam, the lines of intersection of mirror plane and the plane normal to the shaft rotation axis would be set at right angles to one another so that one beam adjuster would provide up/down adjustment and the other adjuster left/right adjustment. Thus, the returning subbeams can then be adjusted to recombine to center the fringe pattern.

In other optical instruments it may be required to send a beam of radiation round a rectangular path. Mirrors used to provide 90° deflection of the beam could form part of the mirror tilt adjustment device described above, the beam being incident on the mirror at 45°.

In FIGS. 1 and 2 an arrangement is shown for making the shaft rotation $\phi$ in a controlled manner which is almost stress free. A bar 14 has a circular cut-out 15 for shaft 1 and is clamped to it via bridge-piece 16, also having a circular cut-out, and set-screws 17 and 18. A screw 19 is provided in a tapped hole in bar 14 at the end remote from shaft 1. Screw 19 bears on a part of the structure 22 and is held in contact with it by a light spring 23, close to screw 19. Rotation of screw 19 provides a small range of angles for angle $\phi$. The force developed by spring 23 on shaft 1 is reduced greatly by lever action, thus reducing stress applied to the shaft during adjustment.

The adhesive used is preferably a thin liquid which sets hard in a short time, running easily into the gap 24 between bearing and shaft by capillary action and setting before the adjustment is disturbed. After the adhesive has set, screws 6 and 7 are removed, together with bar 14 and bridge peice 16, to leave shaft 1 and its supporting structure in an unstressed condition.

I claim:

1. A method of adjusting the direction of a beam of radiation reflected from a mirror comprising the steps of mounting the mirror on a shaft having a longitudinal axis, said mirror having a normal inclined to said longitudinal axis;

lightly loading said shaft against a bearing structure;

rotating said shaft in said bearing structure to adjust the direction of a reflected beam of radiation;

rigidly securing said shaft in said bearing structure after rotating said shaft by applying an adhesive between said shaft and said bearing structure, and causing said adhesive to set; and removing said loading of said shaft after said adhesive has set.

2. A method according to claim 1, wherein said step of loading said shaft occurs kinematically.

3. A method according to claim 2, wherein said step of loading said shaft kinematically is carried out by adjusting screws in said bearing structure set at an angle between 45° and 135° to one another around said bearing structure, said screws being adjusted to produce light contact between inner ends of said screws and said shaft as well as between said shaft and the surface of said bearing structure, and wherein said step of removing said loading is carried out by removing said screws after said adhesive has set.

4. A method according to claim 1 or claim 2 or claim 3, wherein said bearing structure comprises two plain bearings axially separated along said shaft.

5. A method according to claim 1 or claim 2 or claim 3, wherein means are attached to said shaft for rotating said shaft, and wherein said means for rotating are removed after said adhesive has set.

6. An arrangement for adjusting the direction of a beam of radiation comprising
   a shaft mounted in a bearing structure for rotational adjustment, said shaft being lightly loaded against said bearing structure prior to said adjustment; and
   a mirror mounted on said shaft, said mirror having a normal inclined to a longitudinal axis of said shaft;
   said shaft being rigidly secured in said bearing structure by an adhesive after said adjustment, said shaft being freed of loading against said bearing structure after said adhesive has set.

7. An arrangement according to claim 6, wherein said normal to said mirror is inclined at such an angle to said longitudinal axis that the sine of said angle is substantially equal to said angle expressed in radians.

8. An arrangement according to claim 6 or claim 7, wherein said bearing structure comprises two plain bearings axially separated along said shaft.

9. An arrangement according to claim 8, wherein said mirror is a plane mirror.

10. An arrangement according to claim 6 or claim 7, wherein said mirror is a plane mirror.

11. An arrangement according to claim 6 or claim 7, wherein said shaft is lightly loaded against said bearing structure by adjusting screws, said adjusting screws being released after said adhesive has set.

* * * * *